US010666167B2

(12) United States Patent
Okunogi et al.

(10) Patent No.: US 10,666,167 B2
(45) Date of Patent: May 26, 2020

(54) PIEZOELECTRIC UNIT

(71) Applicant: TDK CORPORATION, Tokyo (JP)

(72) Inventors: Masakazu Okunogi, Tokyo (JP);
Tatsuya Taki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 388 days.

(21) Appl. No.: 15/837,050

(22) Filed: Dec. 11, 2017

(65) Prior Publication Data

US 2018/0175748 A1 Jun. 21, 2018

(30) Foreign Application Priority Data

Dec. 21, 2016 (JP) ................................. 2016-248491

(51) Int. Cl.
*H02N 2/04* (2006.01)
*G02B 7/02* (2006.01)
*H02N 2/02* (2006.01)
*G02B 7/04* (2006.01)
*H02N 2/00* (2006.01)

(52) U.S. Cl.
CPC ................ *H02N 2/04* (2013.01); *G02B 7/02* (2013.01); *G02B 7/04* (2013.01); *H02N 2/025* (2013.01); *H02N 2/026* (2013.01); *H02N 2/22* (2013.01)

(58) Field of Classification Search
CPC combination set(s) only.
See application file for complete search history.

(56) References Cited

U.S. PATENT DOCUMENTS

| 2007/0075609 A1* | 4/2007 | Manabe | H02N 2/025 310/329 |
| 2008/0315721 A1* | 12/2008 | Wada | H02N 2/025 310/323.02 |
| 2009/0021115 A1* | 1/2009 | Sasaki | H02N 2/025 310/323.17 |
| 2014/0084751 A1* | 3/2014 | Suzuki | B06B 1/0644 310/317 |
| 2017/0229636 A1* | 8/2017 | Maruyama | H01L 41/042 |

FOREIGN PATENT DOCUMENTS

JP H08-286093 A 11/1996

* cited by examiner

*Primary Examiner* — Bryan P Gordon
(74) *Attorney, Agent, or Firm* — Oliff PLC

(57) ABSTRACT

A piezoelectric unit includes a piezoelectric element that expands and contracts in a first direction, a drive shaft connected with a first end surface of the piezoelectric element, a weight connected with a second end surface of the piezoelectric element, a protection member covering at least a part of the piezoelectric element, the drive shaft, and the weight, and a movable member engaged with the drive shaft. An inner wall surface of the protection member includes a weight position regulating portion that regulates a position of the weight, an element position regulating portion that regulates a position of the piezoelectric element, and a shaft position regulating portion that regulates a position of the drive shaft. An outer wall surface of the protection member has a movable member regulating portion that prevents the movable member from approaching the piezoelectric element.

8 Claims, 13 Drawing Sheets

PIEZOELECTRIC UNIT

BACKGROUND OF THE INVENTION

1. Field of the Invention

The present invention relates to a piezoelectric unit that relatively moves a movable member along a drive shaft.

2. Description of the Related Art

A piezoelectric unit, which is also referred to as a piezoelectric actuator, utilizes piezoelectric effect and inverse piezoelectric effect and utilizes characteristics of a piezoelectric element that mutually converts a mechanical displacement and an electrical displacement. The piezoelectric unit is used in various fields as a linear actuator or so that provides an object with a linear displacement.

The piezoelectric actuator has a comparatively small mechanical displacement, and is thus favorably used for a purpose that requires precise and correct control as an actuator for lens driving of a camera, for example. Patent Document 1 proposes an actuator for lens driving whose durability for tensile stress and bending stress is improved by covering a connection portion between a drive axis (drive shaft) and a piezoelectric element with a reinforcement member.

Patent Document 1: JP H08-286093 A

SUMMARY OF THE INVENTION

In accordance with recent downsizing of camera modules, lens modules, and the like, however, a stress that may be applied per unit cross sectional area is increasing. Thus, a prevention measure against breakage and deformation is necessary for not only a connection portion between a piezoelectric element and a drive shaft but a central portion of the piezoelectric element and a connection portion between the piezoelectric element and a weight. In accordance with downsizing of piezoelectric units, a piezoelectric element capable of being assembled quickly and precisely is further needed.

The present invention has been achieved such circumstances. It is an object of the invention to provide a piezoelectric unit capable of being effectively prevented from being bent or deformed even if receiving external forces and capable of being assembled quickly and precisely.

To achieve the above object, the piezoelectric unit according to a first aspect of the present invention is a piezoelectric unit comprising:

a piezoelectric element that expands and contracts in a first direction;

a drive shaft connected with a first end surface that is one end surface of the piezoelectric element in the first direction;

a weight connected with a second end surface that is the other end surface of the piezoelectric element in the first direction;

a protection member covering at least a part of the piezoelectric element, at least a part of the drive shaft, and at least a part of the weight; and a movable member configured to be engaged with a shaft exposed portion exposed from the protection member in the drive shaft in a relatively movably manner along the first direction, wherein an inner wall surface of the protection member comprises:

a weight position regulating portion facing an outer circumferential surface of the weight and configured to regulate a position of the weight in a vertical direction to the first direction;

an element position regulating portion facing an outer circumferential surface of the piezoelectric element and configured to regulate a position of the piezoelectric element in the vertical direction to the first direction; and a shaft position regulating portion facing an outer circumferential surface of the drive shaft and configured to regulate a position of the drive shaft in the vertical direction to the first direction, and an outer wall surface of the protection member has a movable member regulating portion facing the movable member in the vertical direction to the first direction and configured to prevent the movable member from approaching the piezoelectric element in the vertical direction to the first direction.

In the piezoelectric unit according to the present invention, the protection member covers at least a part of the piezoelectric element, the drive shaft, and the weight, and it is thus possible to effectively prevent a problem of breakage due to impact or so at a central portion of the piezoelectric element, a vicinity of a connection portion between the shaft and the piezoelectric element, and the like, compared to conventional piezoelectric actuators with a reinforcement member covering only a connection portion between a drive shaft and a piezoelectric element. Since the inner wall surface of the protection member has the weight position regulating portion, the element position regulating portion, and the shaft position regulating portion, the piezoelectric unit according to the first aspect of the present invention can be assembled quickly and precisely by arranging the weight, the piezoelectric element, and the drive shaft with respect to the protection member and is thus excellent in productivity.

Moreover, since the protection member has the movable member regulating portion facing the movable member, the piezoelectric unit according to the first aspect of the present invention can prevent a strong stress from applying to the piezoelectric element and a connection portion between the piezoelectric element and the weight or the drive shaft by regulating the movable portion from tilting toward a direction where the movable portion approaches the piezoelectric element, and can improve its durability.

For example, the weight may be fixed to the inner wall surface, the element position regulating portion may be arranged with a first fine clearance against the piezoelectric element, and the shaft position regulating portion may be arranged with a second fine clearance against the drive shaft.

When the weight is fixed to the inner wall surface, a position of the protection member to the weight is fixed. Thus, such a piezoelectric unit can be easily assembled precisely and effectively by assembling the weight, the piezoelectric element, and the drive shaft along the inner wall surface of the protection member. When the weight is fixed to the protection member, the protection member can favorably protect the piezoelectric element and the drive shaft from external impact or so without fixing the protection member to a board or so. When the element position regulating portion and the shaft position regulating portion are arranged with the fine clearance against the piezoelectric element or the drive shaft, a problem that the protection member prevents a displacement of the piezoelectric element does not occur.

For example, the piezoelectric unit according to a second aspect of the present invention is a piezoelectric unit comprising:

a piezoelectric element that expands and contracts in a first direction;

a drive shaft connected with a first end surface that is one end surface of the piezoelectric element in the first direction;

a weight connected with a second end surface that is the other end surface of the piezoelectric element in the first direction; and a protection member covering at least a part of the piezoelectric element, at least a part of the drive shaft, and at least a part of the weight, wherein an inner wall surface of the protection member comprises:

a weight position regulating portion facing an outer circumferential surface of the weight and configured to regulate a position of the weight in a vertical direction to the first direction;

an element position regulating portion facing an outer circumferential surface of the piezoelectric element and configured to regulate a position of the piezoelectric element in the vertical direction to the first direction; and a shaft position regulating portion facing an outer circumferential surface of the drive shaft and configured to regulate a position of the drive shaft in the vertical direction to the first direction, the weight is fixed to the inner wall surface, the element position regulating portion is arranged with a first fine clearance against the piezoelectric element, and the shaft position regulating portion is arranged with a second fine clearance against the drive shaft.

In the piezoelectric unit according to the second aspect of the present invention, the protection member covers at least a part of the piezoelectric element, the drive shaft, and the weight in the same manner as the piezoelectric unit according to the first aspect of the present invention, and it is thus possible to effectively prevent a problem of breakage due to impact or so at a central portion of the piezoelectric element, a vicinity of a connection portion between the shaft and the piezoelectric element, and the like, compared to conventional piezoelectric actuators with a reinforcement member covering only a connection portion between a drive shaft and a piezoelectric element. Since the inner wall surface of the protection member has the weight position regulating portion, the element position regulating portion, and the shaft position regulating portion, the piezoelectric unit according to the second aspect of the present invention can be assembled quickly and precisely by arranging the weight, the piezoelectric element, and the drive shaft with respect to the protection member and is thus excellent in productivity.

Moreover, when the weight is fixed to the inner wall surface, a position of the protection member to the weight is fixed. Thus, such a piezoelectric unit can be easily assembled precisely and effectively by assembling the weight, the piezoelectric element, and the drive shaft along the inner wall surface of the protection member. When the weight is fixed to the protection member, the protection member can favorably protect the piezoelectric element and the drive shaft from external impact or so without fixing the protection member to another member such as a board. When the element position regulating portion and the shaft position regulating portion are arranged with the fine clearance against the piezoelectric element or the drive shaft, a problem that the protection member prevents a displacement of the piezoelectric element does not occur.

For example, the piezoelectric unit according to the second aspect of the present invention may further comprise a movable member configured to be relatively movably engaged with a shaft exposed portion of the drive shaft exposed from the protection member along the first direction, wherein an outer wall surface of the protection member may have a movable member regulating portion facing the movable member in the vertical direction to the first direction and configured to prevent the movable member from approaching the piezoelectric element in the vertical direction to the first direction.

When the protection member has the movable member regulating portion facing the movable member, the piezoelectric unit according to the second aspect of the present invention can prevent a strong stress from applying to the piezoelectric element and a connection portion between the piezoelectric element and the weight or the drive shaft by regulating the movable portion from tilting toward a direction where the movable portion approaches the piezoelectric element, and can improve its durability.

For example, the piezoelectric element may have an external electrode for supplying electricity, and at least a part of the external electrode may be exposed from the protection member.

When the external electrode of the piezoelectric element is exposed from the protection member, a board where the piezoelectric unit is mounted and the external electrode can be easily connected by a conductive connection member, such as a solder.

For example, the inner wall surface may have a relief portion positioned between the element position regulating portion and the weight position regulating portion, a distance between the relief position and the piezoelectric element may be longer than a distance between the element position regulating portion and the piezoelectric element, and a distance between the relief position and the weight may be longer than a distance between the weight position regulating portion and the weight.

When the inner wall surface has such a relief portion, for example, even if an adhesive connecting the piezoelectric element and the drive shaft overflows from the surfaces of the weight and the piezoelectric element, the inner wall surface of the protection member can be arranged at an appropriate position with respect to the outer circumferential surfaces of the piezoelectric element and the weight without being disturbed by the overflow of the adhesive.

DESCRIPTION OF THE PREFERRED EMBODIMENTS

Hereinafter, embodiments of the present invention are described based on figures.

First Embodiment

Figure 1:
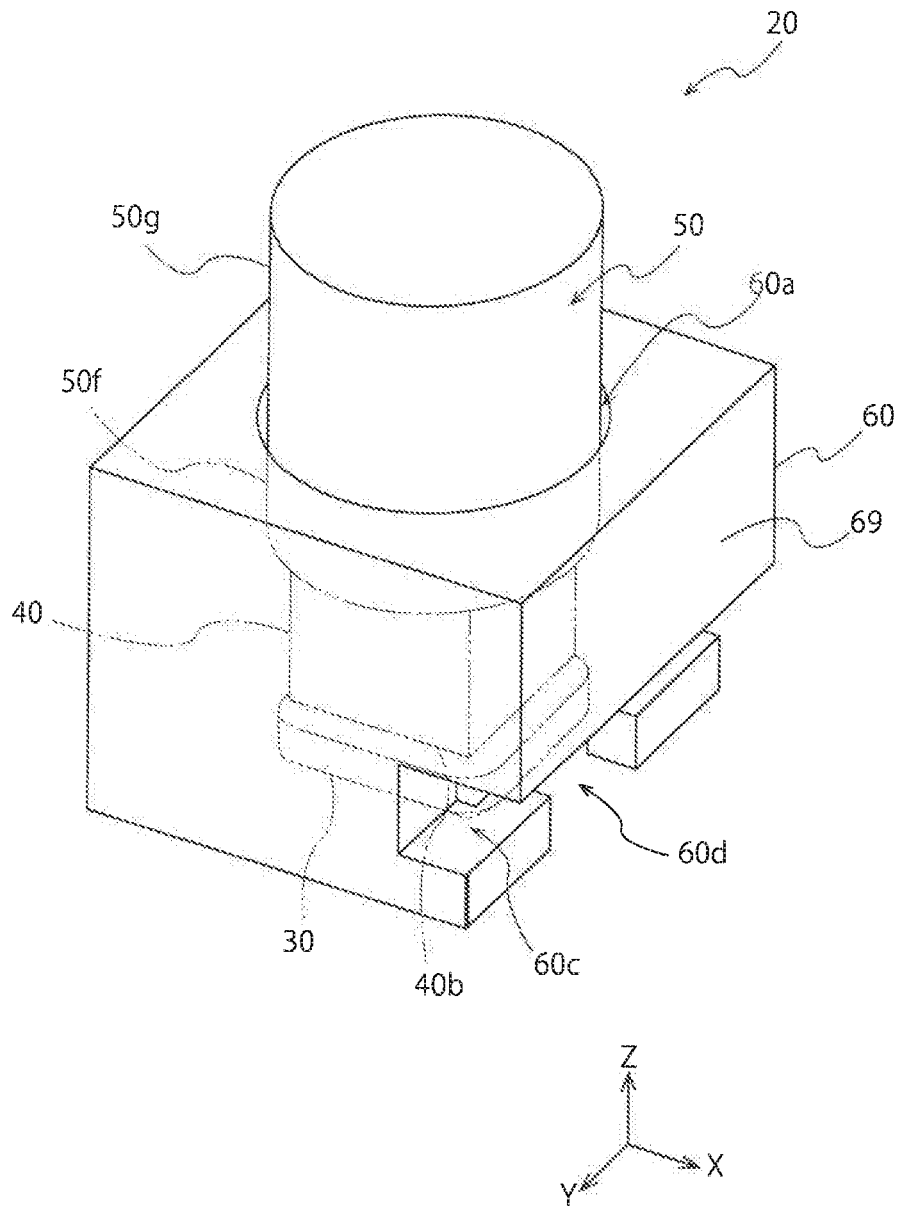
FIG. 1 is a schematic perspective view of a piezoelectric unit (actuator portion) according to First Embodiment of the present invention.
Figure 7:
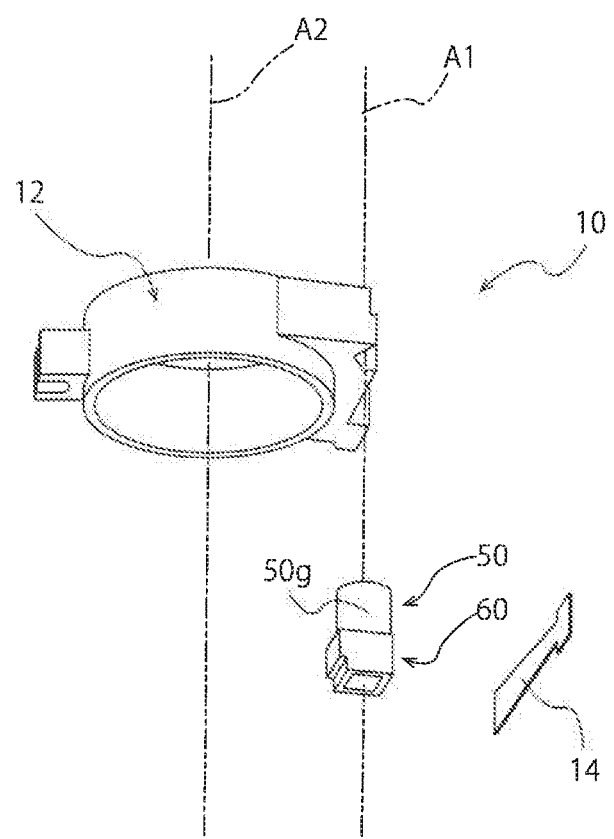
FIG. 7 is a disassembled perspective view of a piezoelectric unit according to Second Embodiment of the present invention.
Figure 8:
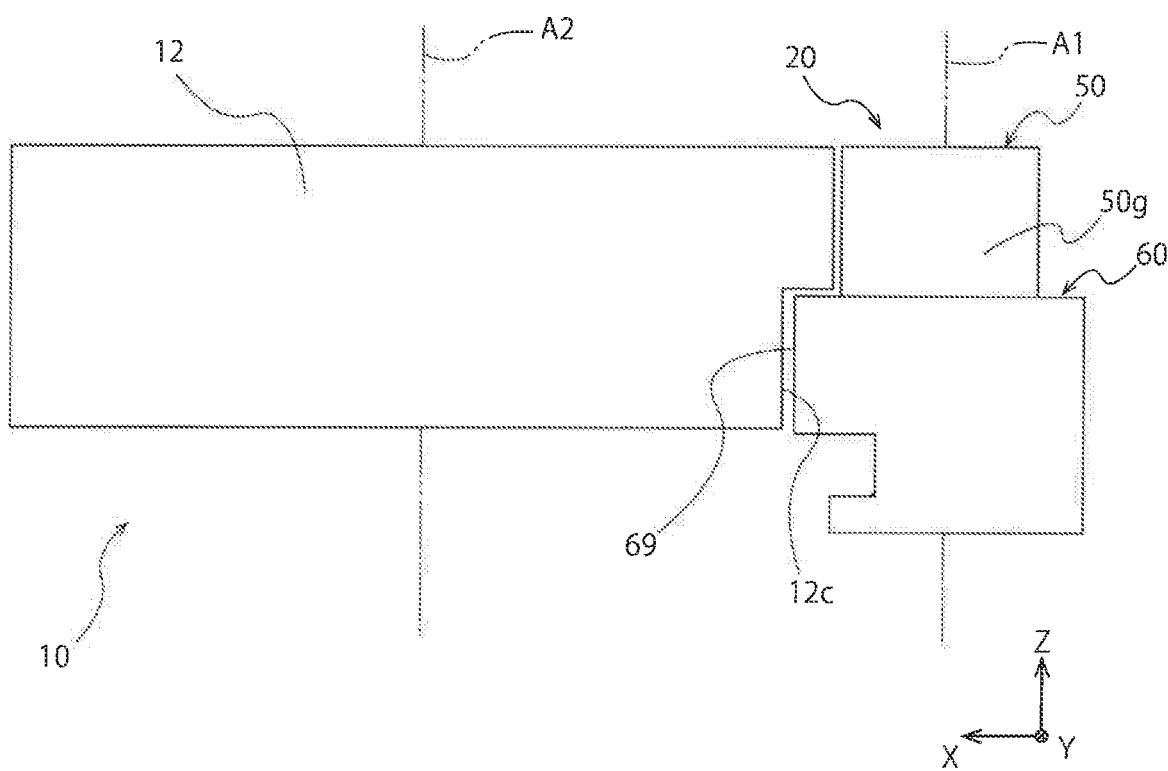
FIG. 8 is a schematic front view of a piezoelectric unit according to Second Embodiment of the present invention.

FIG. 1 is a schematic perspective view showing a piezoelectric actuator 20 as a piezoelectric unit according to First Embodiment of the present invention. The piezoelectric actuator 20 can constitute a piezoelectric unit 10 containing a lens holder 12 as shown in FIG. 7 and FIG. 8, but may be used as an actuator that moves other members except for the lens holder 12. The piezoelectric unit is not limited to the structures shown in FIG. 1 or FIG. 7.

Figure 6:
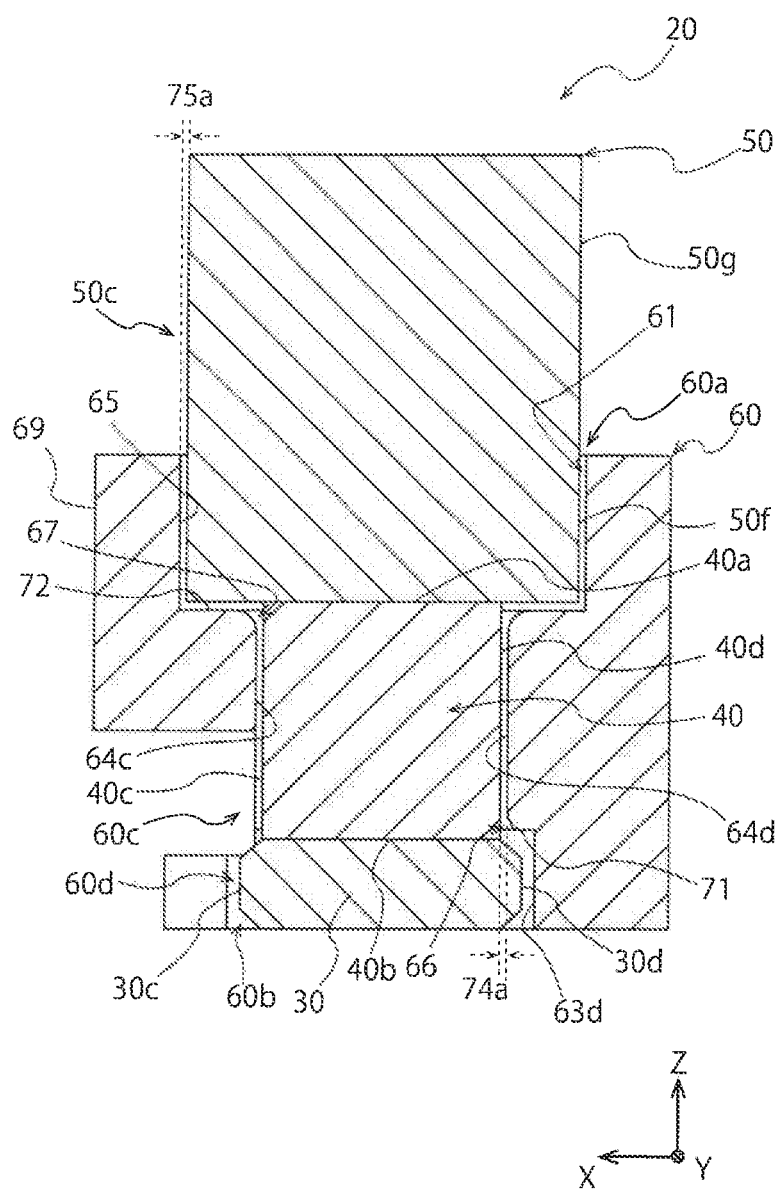
FIG. 6 is a cross sectional view taken along line VI-VI shown in FIG. 2.

As shown in FIG. 1, the piezoelectric actuator 20 has a piezoelectric element 40, a drive shaft 50, a weight 30, and a protection member 60. As shown in FIG. 1 and FIG. 6, which is a cross sectional view, the piezoelectric element 40 has an approximately rectangular parallelepiped outer shape and expands and contracts in the Z-axis direction (first direction).

As shown in FIG. 6, the piezoelectric element 40 has a first end surface 40a and a second end surface 40b. The first end surface 40a is one end surface in the Z-axis direction, and the second end surface 40b is the other end surface in the Z-axis direction. The first end surface 40a is a surface facing the positive side of the Z-axis direction, and the second end surface 40b is a surface facing the negative side of the Z-axis direction.

The piezoelectric element 40 has four outer circumferential surfaces vertical to the first end surface 40a and the second end surface 40b. The four outer circumferential surfaces consist of a first outer circumferential surface 40c facing the positive side in the X-axis direction, a second outer circumferential surface 40d facing the negative side in the X-axis direction, a third outer circumferential surface 40e facing the positive side in the Y-axis direction, and a fourth outer circumferential surface 40f facing the negative side in the Y-axis direction. A pair of external electrodes is formed on the third outer circumferential surface 40e and the fourth outer circumferential surface 40f of the piezoelectric element 40 shown in FIG. 2.

In the piezoelectric element 40, internal electrode layers electrically connected with one of the external electrodes (formed on the third outer circumferential surface 40e) and internal electrode layers electrically connected with the other external electrode (formed on the fourth outer circumferential surface 40f) are laminated alternately by sandwiching dielectric layers. A lamination direction of the internal electrode layers and the dielectric layers of the piezoelectric element 40 is the Z-axis direction (first direction), but the piezoelectric element 40 is laminated in any direction.

Figure 12:
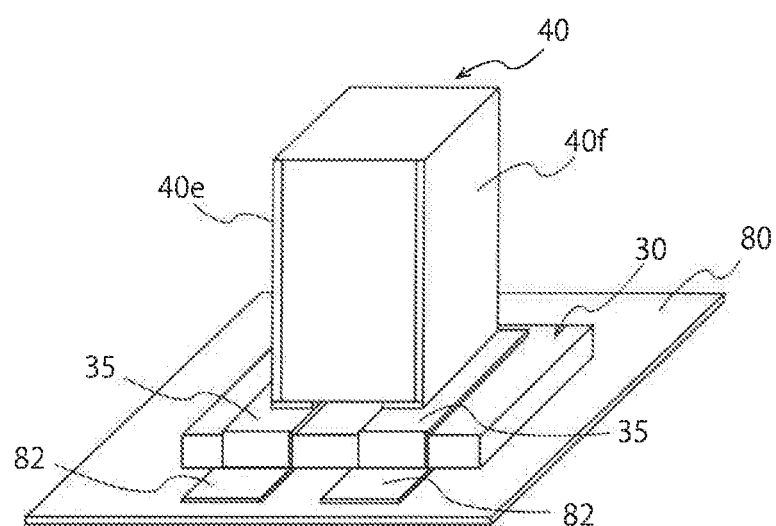
FIG. 12 is a conceptual view showing a state where the piezoelectric unit according to First Embodiment is mounted on a board.

FIG. 12 schematically shows wirings to the piezoelectric element 40. A part of the external electrodes formed on the piezoelectric element 40 reaches the second end surface 40b of the piezoelectric element 40 and is electrically connected with wiring portions 35 formed on the surface of the weight 30. Moreover, the wiring portions 35 formed on the surface of the weight 30 are connected with wiring portions 82 formed on a mount board 80 by mounting the piezoelectric actuator 20 on the mount board 80. Thus, the external electrodes of the piezoelectric actuator 20 are supplied with electricity via the wiring portions 35 formed on the surface of the weight 30 from the wiring portions 82 formed on the mount board 80. Incidentally, FIG. 12 fails to describe the drive shaft 50 and the protection member 60 of the piezoelectric actuator 20, or the like.

Incidentally, the embodiments are described provided that the Z-axis direction (first direction) is a direction where the piezoelectric actuator 20 expands and contracts and the drive shaft 50 reciprocates, the X-axis direction is a direction (positive direction) from a central axis A1 of the drive shaft 50 toward a central axis A2 of the lens holder 12 of vertical directions to the Z-axis direction, and the Y-axis direction is a vertical direction to the Z-axis direction and the X-axis direction.

The dielectric layer of the piezoelectric element 40 has any thickness, but preferably has a thickness of about 5 to 50 µm. The dielectric layers are composed of any material exhibiting piezoelectric effect or inverse piezoelectric effect, such as $PbZr_xTi_{1-x}O_3$ and $BaTiO_3$. The dielectric layers may contain a component for property improvement or so at an amount appropriately determined based on predetermined properties.

The internal electrode layers laminated alternately with the dielectric layers are composed of any conductive material, such as noble metals of Ag, Pd, Au, Pt, etc., an alloy of these (e.g., Ag—Pd), base metals of Cu, Ni, etc., and an alloy of these. The external electrodes are also composed of any conductive material and can be composed of a similar material to the conductive material constituting the internal electrodes. Incidentally, a plating layer or a sputtered layer of the above-mentioned various metals may be formed outside the external electrodes.

As shown in FIG. 6, the drive shaft 50 is connected with the first end surface 40a of the piezoelectric element 40 and has a columnar shape. In the drive shaft 50, an end surface facing the first end surface 40a of the piezoelectric element 40 has an area that is larger than an area of the first end surface 40a. The drive shaft 50 may have any shape and size, such as a pillar shape and a bar shape. The drive shaft 50 may have an end surface whose area is smaller than an area of the first end surface 40a of the piezoelectric element 40. The drive shaft 50 is fixed to the first end surface 40a of the piezoelectric element 40 by an adhesive or so, but may be fixed thereto by any fixing method.

Figure 3:
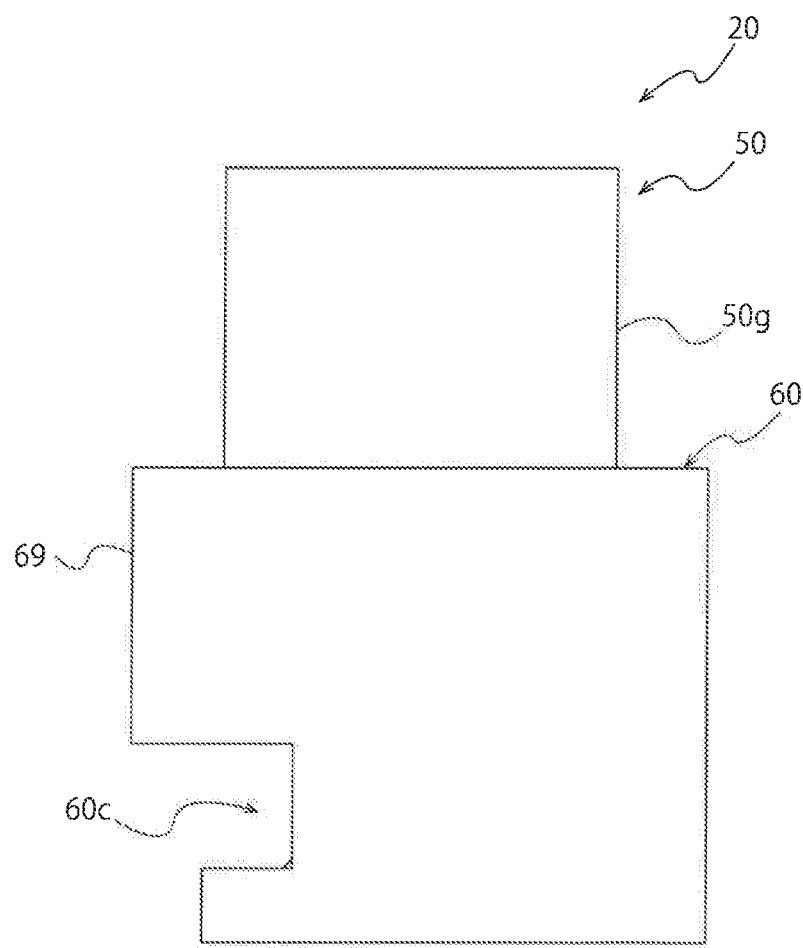
FIG. 3 is a right-side surface view of the piezoelectric unit shown in FIG. 1.

As shown in FIG. 1 and FIG. 3, the drive shaft 50 has a shaft exposed portion 50g exposed from the protection member 60 and a shaft covered portion 50f covered with the protection member 60. The shaft covered portion 50f is a base end portion of the drive shaft 50 close to the piezoelectric element 40. The shaft exposed portion 50g is a tip portion of the drive shaft 50 away from the piezoelectric element 40. The relation between the protection member 60 and the drive shaft 50 is described below.

The drive shaft 50 is composed of any material, such as metal, carbon, and resin.

As shown in FIG. 6, the weight 30 is connected with the second end surface 40b of the piezoelectric element 40. The weight 30 functions as an inertia body that provides a displacement for the drive shaft 50 connected with the first end surface 40a, and is composed of a material whose specific gravity is larger than that of the piezoelectric element 40 and the drive shaft 50, for example. The weight 30 is composed of any material, such as a metal whose specific gravity is large like tungsten and an alloy containing such metal.

Figure 2:
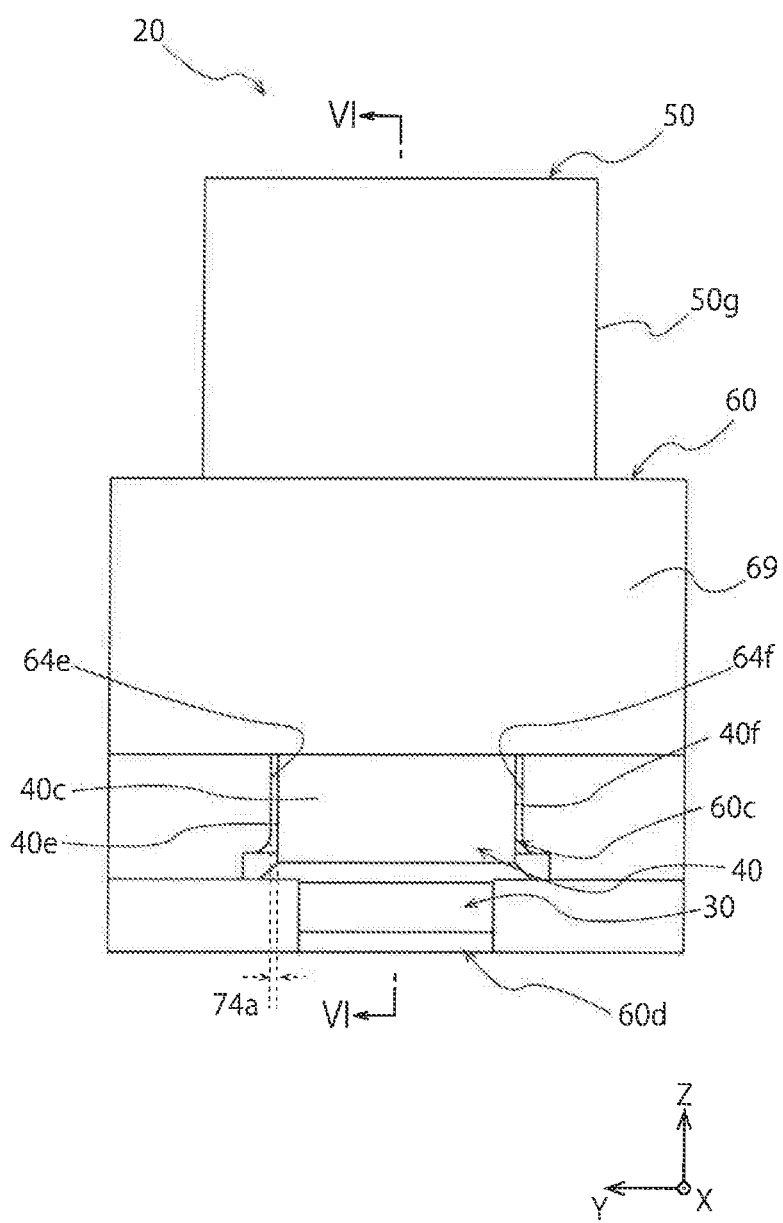
FIG. 2 is a front view of the piezoelectric unit shown in FIG. 1.

As shown in FIG. 2, the weight 30 has a rectangular parallelepiped outer shape whose length in the Z-axis direction is shortest and lengths in the X-axis direction and the Y-axis direction are approximately the same. In the present embodiment, each side of the weight 30 having an approximately rectangular parallelepiped shape is C chamfered, R chamfered, or the like. The weight 30 is not limited to having the rectangular parallelepiped outer shape, and may have another shape, such as a columnar shape and a plate shape.

As shown in FIG. 1, the piezoelectric actuator 20 has the protection member 60 covering at least a part of the piezoelectric element 40, a part of the drive shaft 50, and a part of the weight 30. The protection member 60 has a housing space surrounded by an inner wall surface 61 of the protection member 60 so as to house at least a part of the piezoelectric element 40, the drive shaft 50, and the weight 30. The housing space of the protection member 60 goes through the protection member 60 in the Z-axis direction. The inner wall surface 61 of the protection member 60 continues from a first opening 60a formed on a top surface (surface on the positive side of the Z-axis direction) of the protection member 60 to a second opening 60b formed on a bottom surface (surface on the negative side of the Z-axis direction) of the protection member 60 (see FIG. 5).

As shown in FIG. 6, the inner wall surface 61 of the protection member 60 has a shape conforming to outer circumferential shapes of the piezoelectric element 40, the drive shaft 50, and the weight 30, all of which are housed objects. When the drive shaft 50 and the piezoelectric element 40 move toward vertical directions to the Z-axis direction or are tilted, the inner wall surface 61 of the protection member 60 touches and supports the drive shaft 50 or the piezoelectric element 40, and the protection member 60 can thus protect the piezoelectric element 40 from being damaged.

Figure 5:
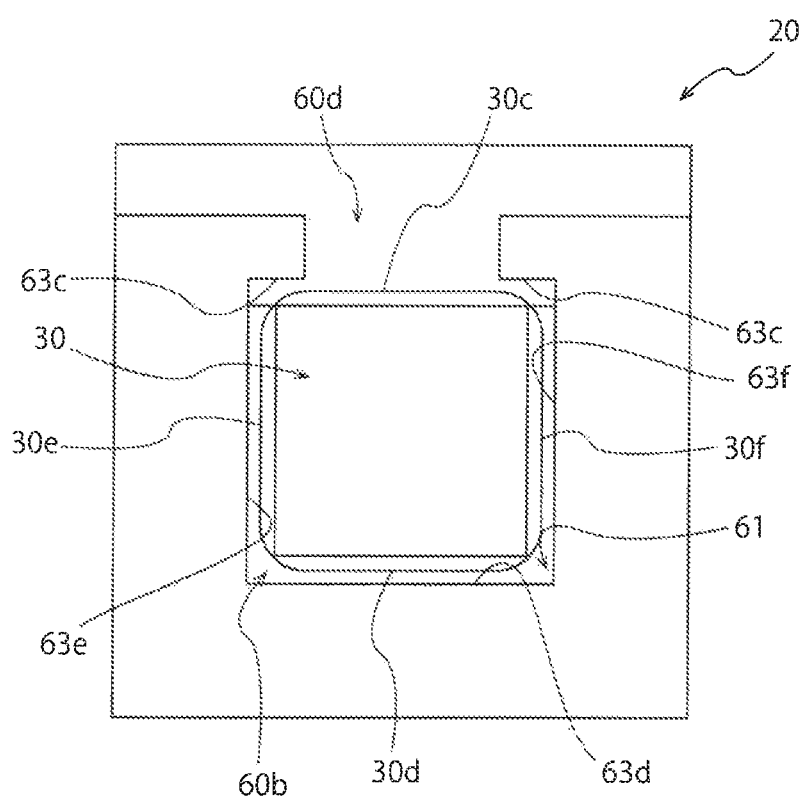
FIG. 5 is a bottom view of the piezoelectric unit shown in FIG. 2.

As shown in FIG. 5, the inner wall surface 61 of the protection member 60 faces the outer circumferential surface of the weight 30 and has a weight position regulating portion that regulates a position of the weight 30 in the X-axis direction and the Y-axis direction vertical to the Z-axis direction. The weight position regulating portion consists of a first lower wall surface 63c facing a first outer circumferential surface 30c of the weight 30, a second lower wall surface 63d facing a second outer circumferential surface 30d of the weight 30, a third lower wall surface 63e facing a third outer circumferential surface 30e of the weight 30, and a fourth lower wall surface 63f facing a fourth outer circumferential surface 30f of the weight 30. The first to fourth lower wall surfaces 63c to 63f constituting the weight position regulating portion are vertical surfaces to the X-Y plane and surround the outer circumference of the first to fourth outer circumferential surfaces 30c to 30f vertical to the X-Y plane of the weight 30.

Both of the first lower wall surface 63c and the second lower wall surface 63d of the first to fourth lower wall surfaces 63c to 63f constituting the weight position regulating portion are parallel to the Y-Z plane and face each other by sandwiching the weight 30. That is, the first lower wall surface 63c and the second lower wall surface 63d are positioned on both sides of the weight 30 in the X-axis direction and regulate a position of the weight 30 in the X-axis direction. A fine clearance may be formed between the first lower wall surface 63c and the first outer circumferential surface 30c of the weight 30 or between the second lower wall surface 63d and the second outer circumferential surface 30d of the weight 30, but the first lower wall surface 63c and the first outer circumferential surface 30c and the second lower wall surface 63d and the second outer circumferential surface 30d may be connected with each other by a resin or so.

Both of the third lower wall surface 63e and the fourth lower wall surface 63f of the first to fourth lower wall surfaces 63c to 63f constituting the weight position regulating portion are parallel to the X-Z plane and face each other by sandwiching the weight 30. That is, the third lower wall surface 63e and the fourth lower wall surface 63f are positioned on both sides of the weight 30 in the Y-axis direction and regulate a position of the weight 30 in the Y-axis direction. A fine clearance may be formed between the third lower wall surface 63e and the third outer circumferential surface 30e of the weight 30 or between the fourth lower wall surface 63f and the fourth outer circumferential surface 30f of the weight 30, but the third lower wall surface 63e and the third outer circumferential surface 30e and the fourth lower wall surface 63f and the fourth outer circumferential surface 30f may be connected with each other by a resin or so.

As shown in FIG. 5, a fourth opening 60d exposing the first outer circumferential surface 30c of the weight 30 is formed on a side surface facing the positive side of the X-axis direction of the side surfaces of the protection member 60, and the fourth opening 60d divides the first lower wall surface 63c of the weight position regulating portion into two parts. Since the first outer circumferential surface 30c of the weight 30 is exposed by the fourth opening 60d, as shown in FIG. 12, the wiring portions 35 formed on the weight 30 and the wiring portions 82 formed on the mount board 80 can be easily connected with each other by a conductive connection member or so.

The inner wall surface 61 of the protection member 60 and the weight 30 shown in FIG. 6 are connected with each other by an adhesive or so at any position, but may not be connected with each other. The protection member 60 may be connected with none of the weight 30, the piezoelectric element 40, and the drive shaft 50.

As shown in FIG. 2 and FIG. 6, the inner wall surface 61 of the protection member 60 faces the outer circumferential surface of the piezoelectric element 40 and has an element position regulating portion that regulates a position of the piezoelectric element 40 in the X-axis direction and the Y-axis direction vertical to the Z-axis direction. The element position regulating portion consists of a first middle wall surface 64c facing a first outer circumferential surface 40c of the piezoelectric element 40, a second middle wall surface 64d facing a second outer circumferential surface 40d of the piezoelectric element 40, a third middle wall surface 64e facing a third outer circumferential surface 40e of the piezoelectric element 40, and a fourth middle wall surface 64f facing a fourth outer circumferential surface 40f of the piezoelectric element 40 (see FIG. 2). The first to fourth middle wall surfaces 64c to 64f constituting the element position regulating portion are vertical surfaces to the X-Y plane and surround the outer circumference of the first to fourth outer circumferential surfaces 40c to 40f vertical to the X-Y plane of the piezoelectric element 40.

As shown in FIG. 6, both of the first middle wall surface 64c and the second middle wall surface 64d of the first to fourth middle wall surfaces 64c to 64f constituting the element position regulating portion are parallel to the Y-Z plane and face each other by sandwiching the piezoelectric element 40. That is, the first middle wall surface 64c and the second middle wall surface 64d are positioned on both sides of the piezoelectric element 40 in the X-axis direction and regulate a position of the piezoelectric element 40 in the X-axis direction. A first fine clearance 74a is formed between the first middle wall surface 64c and the first outer circumferential surface 40c of the piezoelectric element 40 and between the second middle wall surface 64d and the second outer circumferential surface 40d of the piezoelectric element 40. The first middle wall surface 64c and the first outer circumferential surface 40c and the second middle wall surface 64d and the second outer circumferential surface 40d are spaced and not connected with each other. The first fine clearance 74a has any size, but preferably has a size of 10 to 100 μm, more preferably has a size of 10 to 50 μm, for example. Incidentally, the size of the first fine clearance 74a is 25 μm in the present embodiment.

As shown in FIG. 2, both of the third middle wall surface 64e and the fourth middle wall surface 64f of the first to fourth middle wall surfaces 64c to 64f constituting the element position regulating portion are parallel to the X-Z plane and face each other by sandwiching the piezoelectric element 40. That is, the third middle wall surface 64e and the fourth middle wall surface 64f are positioned on both sides of the piezoelectric element 40 in the Y-axis direction and regulate a position of the piezoelectric element 40 in the Y-axis direction. The first fine clearance 74a is formed between the third middle wall surface 64e and the third outer circumferential surface 40e of the piezoelectric element 40 and between the fourth middle wall surface 64f and the fourth outer circumferential surface 40f of the piezoelectric element 40. The third middle wall surface 64e and the third outer circumferential surface 40e and the fourth middle wall surface 64f and the fourth outer circumferential surface 40f are spaced and not connected with each other.

As shown in FIG. 2 and FIG. 6, a third opening 60c exposing the first outer circumferential surface 40c of the piezoelectric element 40 is formed on a side surface facing the positive side of the X-axis direction of the side surfaces of the protection member 60. As shown in FIG. 6, the third opening 60c is formed on the lower side of the first middle wall surface 64c and is continuous to the fourth opening 60d below. Since the top surface of the weight 30 is exposed from the protection member 60 by the third opening 60c and the fourth opening 60d, as shown in FIG. 12, the wiring portions 35 formed on the weight 30 and the wiring portions 82 formed on the mount board 80 can be easily connected with each other by a conductive connection member or so.

The inner wall surface 61 of the protection member 60 and the piezoelectric element 40 shown in FIG. 6 are not directly connected with each other by an adhesive or so, and the protection member 60 does not prevent a displacement of the piezoelectric element 40. If a piezoelectric active part of the piezoelectric element 40 is not connected with the protection member 60 and the protection member 60 is not prevented from being displaced, however, a piezoelectric inactive part or so arranged in a vicinity or so of a connection part between the piezoelectric element 40 and the weight 30 may be connected with the protection member 60.

Figure 4:
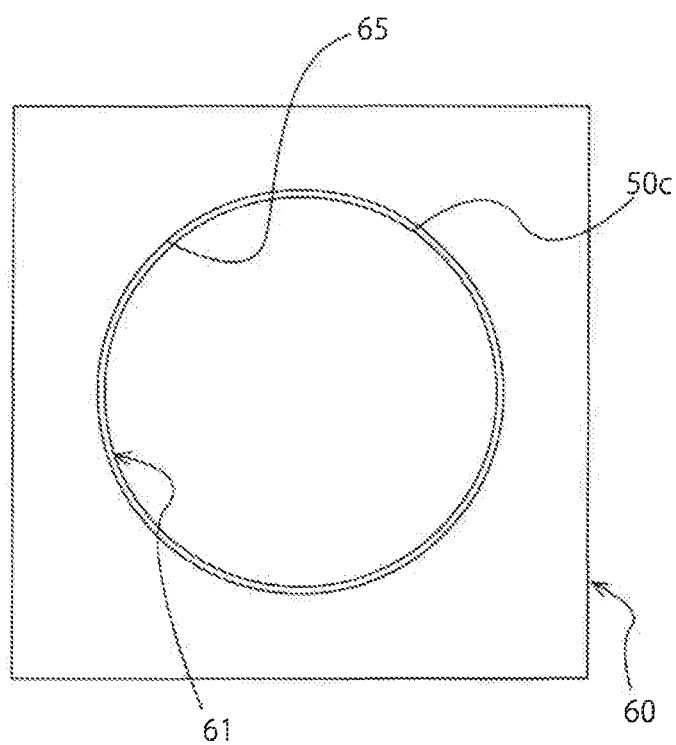
FIG. 4 is a top view of the piezoelectric unit shown in FIG. 1.

As shown in FIG. 4, the inner wall surface 61 of the protection member 60 faces a shaft outer circumferential surface 50c of the drive shaft 50 and has a shaft position regulating member 65 that regulates a position of the drive shaft 50 in the X-axis direction and the Y-axis direction vertical to the Z-axis direction. As shown in FIG. 4, the shaft position regulating member 65 has a circular pipe shape and surrounds the outer circumferential surface of the drive shaft 50 having a columnar shape.

As shown in FIG. 6, the shaft position regulating member 65 has a length in the Z-axis direction that is shorter than a length of the drive shaft 50 in the Z-axis direction, and the shaft exposed portion 50g, which is a part of the drive shaft 50, is exposed upward from the first opening 60a of the protection member 60.

A second fine clearance 75a is formed between the shaft position regulating member 65 and the shaft outer circumferential surface 50c of the drive shaft 50. The shaft position regulating member 65 and the shaft outer circumferential surface 50c of the drive shaft 50 are spaced and not connected with each other. The second fine clearance 75a has any size, but preferably has a size of 10 to 100 μm, more preferably has a size of 10 to 50 μm, for example. Incidentally, the size of the second fine clearance 75a is 25 μm in the present embodiment. The inner wall surface 61 of the protection member 60 and the drive shaft 50 are not directly connected with each other by an adhesive or so, and the protection member 60 does not prevent a displacement of the drive shaft 50 connected with the piezoelectric element 40.

As shown in FIG. 6, the inner wall surface 61 of the protection member 60 has the second lower wall surface 63d as the weight position regulating portion, the second middle wall surface 64d as the element position regulating portion, and the shaft position regulating member 65. A step surface 71 accompanied by the difference in length of the X-axis direction between the weight 30 and the piezoelectric element 40 is formed between the second lower wall surface 63d as the weight position regulating portion and the second middle wall surface 64d as the element position regulating portion. The step surface 71 is a vertical surface to the Z-axis direction.

Moreover, the inner wall surface 61 has not only the step surface 71 vertical to the Z-axis direction but a first relief portion 66 transiently spaced from the piezoelectric element 40 toward below between the second lower wall surface 63d and the second middle wall surface 64d. A distance between the first relief portion 66 and the piezoelectric element 40 is longer than a distance between the second middle wall surface 64d as the element position regulating portion and the piezoelectric element 40, and a distance between the first relief portion 66 and the weight 30 is longer than a distance between the second lower wall surface 63d as the weight position regulating portion and the weight 30.

Since the inner wall surface 61 has the first relief portion 66 between the second lower wall surface 63d and the second middle wall surface 64d, for example, even if an adhesive connecting the piezoelectric element 40 and the weight 30 overflows from the surfaces of the weight 30 and the piezoelectric element 40, the second middle wall surface 64d and the second lower wall surface 63d of the protection member 60 can be arranged at an appropriate position with respect to the second outer circumferential surfaces 40d and 30d of the piezoelectric element 40 and the weight 30. Incidentally, the first relief portion 66 is also formed between the first lower wall surface 63c and the first middle wall surface 64c and among the third lower wall surface 63e, the third middle wall surface 64e and the fourth lower wall surface 63f, and the fourth middle wall surface 64f.

As shown in FIG. 6, a step surface 72 accompanied by the difference in length in the X-axis direction between the drive shaft 50 (outer diameter) and the the piezoelectric element 40 is formed between the shaft position regulating member 65 and the first middle wall surface 64c as the element position regulating portion on the inner wall surface 61 of the protection member 60. The step surface 72 is a vertical surface to the Z-axis direction.

Moreover, the inner wall surface 61 has not only the step surface 72 vertical to the Z-axis direction but a second relief portion 67 transiently spaced from the piezoelectric element 40 toward below between the shaft position regulating member 65 and the first middle wall surface 64c. A distance between the second relief portion 67 and the piezoelectric element 40 is longer than a distance between the first middle wall surface 64c as the element position regulating portion and the piezoelectric element 40, and a distance between the second relief portion 67 and the drive shaft 50 is longer than a distance between the shaft position regulating member 65 and the drive shaft 50.

Since the inner wall surface 61 has the second relief portion 67 between the shaft position regulating member 65 and the first middle wall surface 64c, for example, even if an adhesive connecting the piezoelectric element 40 and the drive shaft 50 overflows from the surfaces of the drive shaft 50 and the piezoelectric element 40, the first middle wall surface 64c and the shaft position regulating member 65 of the protection member 60 can be arranged at an appropriate position with respect to the first outer circumferential surface 40c of the piezoelectric element 40 and the shaft outer circumferential surface 50c of the drive shaft 50 without being disturbed by the overflow of the adhesive. Incidentally, the second relief portion 67 is also formed between the second middle wall surface 64d, the third middle wall surface 64e, and the fourth middle wall surface 64f and the shaft outer circumferential surface 50c of the drive shaft 50.

The piezoelectric actuator 20 shown in FIG. 1 to FIG. 6 is assembled in the following manner, for example.

Figure 13A:
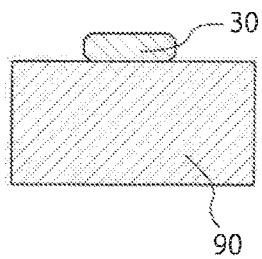
FIGS. 13A-13D are conceptual views showing an example of an assembling process of the piezoelectric unit according to First Embodiment.
Figure 13B:
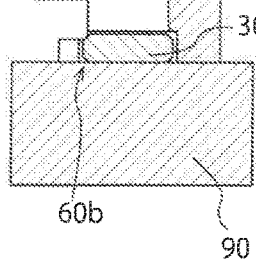

In the assembling of the piezoelectric actuator 20, first, the weight 30 is arranged on a pedestal 90 as shown in FIG. 13A. Next, as shown in FIG. 13B, the weight 30 is covered with the protection member 60 by passing through the second opening 60b of the protection member 60 and being housed in a housed region surrounded by the inner wall surface 61. At this time, the first to fourth lower wall surfaces 63c to 63f (see FIG. 5) as the weight position regulating portion of the protection member 60 are guided by the first to fourth outer circumferential surfaces 30c to 30f of the weight 30, and the protection member 60 and the weight 30 can be positioned easily. The weight 30 and the protection member 60 are fixed by an adhesive or so.

Figure 13C:
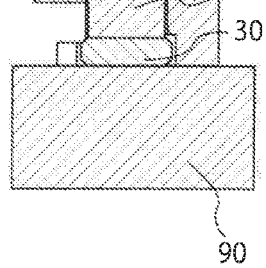

Next, as shown in FIG. 13C, the piezoelectric element 40 is inserted from the first opening 60a of the protection member 60 to the housed region and arranged by overlapping with the weight 30. An adhesive is applied on a facing surface between the weight 30 and the piezoelectric element 40, and the piezoelectric element 40 is fixed to the weight 30. At this time, the first to fourth outer circumferential surfaces 40c to 40f of the piezoelectric element 40 are guided by the first to fourth middle wall surfaces 64c to 64f (see FIG. 2 and FIG. 6) as the element position regulating portion of the protection member 60, and the piezoelectric element 40 is thereby positioned easily with respect to the the protection member 60 and the weight 30.

Figure 13D:
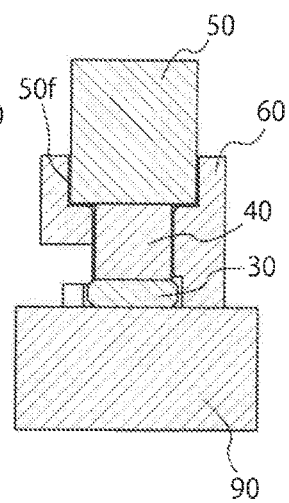

Next, as shown in FIG. 13D, the shaft covered portion 50f of the drive shaft 50 is inserted from the first opening 60a of the protection member 60 to the housed region and arranged by overlapping with the piezoelectric element 40. An adhesive is applied on a facing surface between the piezoelectric element 40 and the drive shaft 50, and the drive shaft 50 is fixed to the piezoelectric element 40. At this time, the shaft outer circumferential surface 50c of the drive shaft 50 is guided by the the shaft position regulating member 65 (see FIG. 4) of the protection member 60, and the drive shaft 50 is thereby positioned easily with respect to the the protection member 60, the weight 30, and the piezoelectric element 40.

The piezoelectric actuator 20 can be therefore assembled through the steps shown in FIG. 13A to FIG. 13D. In the steps, the protection member 60 functions as a guide for positioning each member, and the piezoelectric actuator 20 can be thereby assembled easily with a high positional accuracy.

Figure 14A:
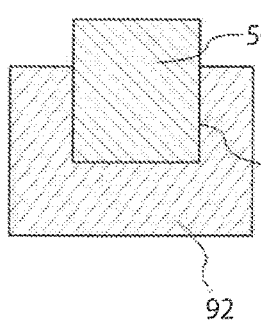
FIGS. 14A-14D are conceptual views showing another example of an assembling process of the piezoelectric unit according to First Embodiment.
Figure 14B:
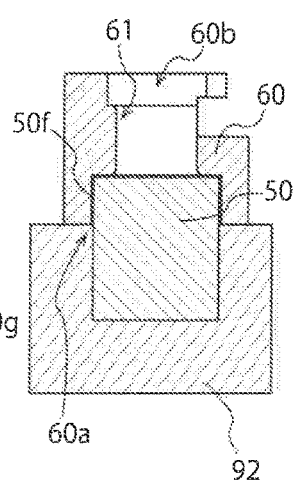

Incidentally, the piezoelectric actuator 20 is not limited to being manufactured by the method shown in FIG. 13A to FIG. 13D and can be manufactured by another method. In the method shown in FIG. 14A to FIG. 14D, for example, the drive shaft 50 is firstly arranged on a pedestal 92 with a hollow for housing the shaft exposed portion 50g of the drive shaft 50 (FIG. 14A), and the drive shaft 50 is thereafter covered with the protection member 60 so that the shaft covered portion 50f passes through the first opening 60a of the protection member 60 and is housed in a housed region surrounded by the inner wall surface 61 (FIG. 14b).

Figure 14C:
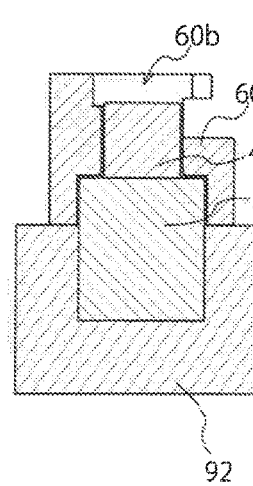
Figure 14D:
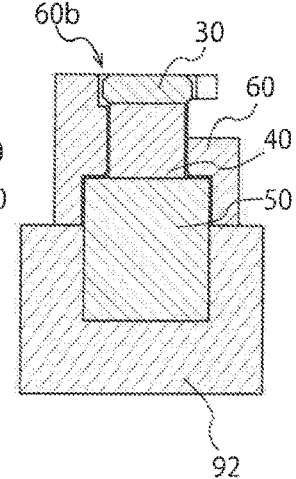

Next, the piezoelectric element 40 is inserted from the second opening 60b of the protection member 60 to the housed region and is arranged by overlapping with the drive shaft 50 (FIG. 14C). Next, the weight 30 is inserted from the second opening 60b of the protection member 60 to the housed region and arranged by overlapping with the piezoelectric element 40. Thus, the piezoelectric actuator 20 can be also assembled easily by the method shown in FIG. 14A to FIG. 14D. Incidentally, each member constituting the piezoelectric actuator 20 in the method shown in FIG. 14A to FIG. 14D is joined in a similar manner to the method shown in FIG. 13A to FIG. 13D.

Since the piezoelectric actuator 20 shown in FIG. 1 to FIG. 6 has the protection member 60 having the inner wall surface 61 continuing from an overlapped position with the weight 30 to an overlapped position with the drive shaft 50 in the Z-axis direction, it is possible to favorably prevent a problem with breakage and damage of the piezoelectric element 40 due to external forces. Since the inner wall surface 61 of the protection member 60 has the weight position regulating portion (first to fourth lower wall surfaces 63c to 63f), the element position regulating portion (first to fourth middle wall surfaces 64c to 64f), and the shaft position regulating member 65, the piezoelectric actuator 20 shown in FIG. 1 to FIG. 6 can be assembled quickly and precisely by arranging the weight 30, the piezoelectric element 40, and the drive shaft 50 with respect to the protection member 60.

Since the weight 30 is fixed to the protection member 60, even if the protection member 60 is not fixed to other members, such as a mount board, the protection member 60 can favorably protect the piezoelectric element 40 and a joining part between the piezoelectric element 40 and other members from impacts from outside. Since the element position regulating portion and the shaft position regulating portion are arranged with the first or second fine clearance 74a or 75a against the piezoelectric element 40 or the drive shaft 50, a problem that the protection member 60 prevents a displacement of the piezoelectric element 40 does not occur.

Second Embodiment

FIG. 7 is a disassembled perspective view of a piezoelectric unit 10 according to Second Embodiment of the present invention. The piezoelectric unit 10 has a piezoelectric actuator 20 described in First Embodiment, a lens holder 12 that holds a lens, and an energization member 14 for engaging a lens holder 12 with a drive shaft 50 of the piezoelectric actuator 20.

The lens holder 12 holds a lens not illustrated and is engaged with a shaft exposed portion 50g of the drive shaft 50 using the energization member 14. A movable member consisting of the lens holder 12 and the energization member 14 moves relatively to the drive shaft 50 along the Z-axis direction, which is a direction where a piezoelectric element 40 expands and contracts. As shown in FIG. 7, a light axis A2 of the lens held by the lens holder 12 (a central axis of the lens holder 12) is parallel to a central axis A1 of the drive shaft 50.

FIG. 8 is a schematic side surface view showing a state where the piezoelectric unit 10 shown in FIG. 7 is assembled. FIG. 8 shows a simplified shape of the detailed part of the lens holder 12 and fails to show the energization member 14. As shown in FIG. 8, the lens holder 12 of the piezoelectric unit 10 is frictionally engaged with the drive shaft 50 of the piezoelectric actuator 20.

The outer wall surface of the protection member 60 has a movable member regulating portion 69 facing the lens holder 12 in the X-axis direction vertical to the Z-axis direction. The movable member regulating portion 69 faces a holder outer circumferential surface 12c that is a part of the outer wall surface of the lens holder 12. The movable member regulating portion 69 and the holder outer circumferential surface 12c are arranged along an axis (X-axis in FIG. 8) vertical to both the central axis A1 of the drive shaft 50 and the light axis A2 of the lens.

The movable member regulating portion 69 is arranged between the piezoelectric element 40 (see FIG. 6) housed in the protection member 60 and the lens holder 12, and prevents the lens holder 12 from approaching the piezoelectric element 40 in the X-axis direction. This makes it possible to prevent a problem of collision of the lens holder 12 inclined by external forces or so with the piezoelectric element 40 and prevent the piezoelectric element 40 from being damaged by the collision with the lens holder 12. When a force that tilts the lens holder 12 acts, the movable member regulating portion 69 contacts the holder outer circumferential surface 12c and prevents the lens holder 12 from tilting largely. Thus, the piezoelectric unit 10 prevents the lens holder 12 from tilting, and favorably prevents a force in a direction where the piezoelectric element 40 is bent via the drive shaft 50 engaged with the lens holder 12 from acting against the piezoelectric element 40.

Third Embodiment

Figure 9:
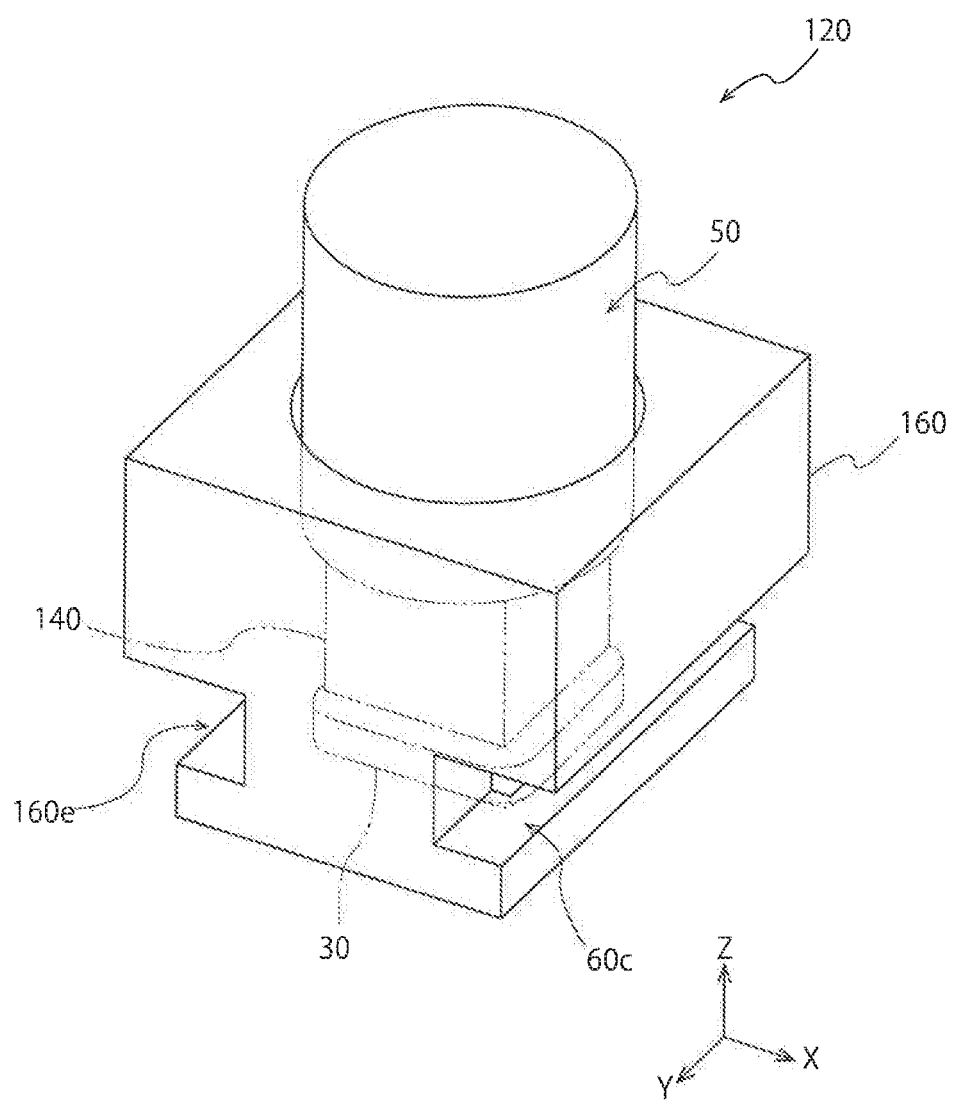
FIG. 9 is a schematic perspective view of a piezoelectric unit according to Third Embodiment of the present invention.

FIG. 9 is a schematic perspective view showing a piezoelectric actuator 120 as a piezoelectric unit according to Third Embodiment of the present invention. The piezoelectric actuator 120 is different from the piezoelectric actuator 20 according to First Embodiment in formation position of external electrodes of a piezoelectric element 140. Moreover, the piezoelectric actuator 120 is different from the piezoelectric actuator 20 according to First Embodiment in that a fourth opening 60d is not formed in a protection member 160, but a fifth opening 160e is instead formed therein. Apart from the respect, however, the piezoelectric actuator 120 is the same as the piezoelectric actuator 20. The piezoelectric actuator 120 is described with respect to only the differences with the piezoelectric actuator 20, and common parts with the piezoelectric actuator 20 are not described.

Figure 10:
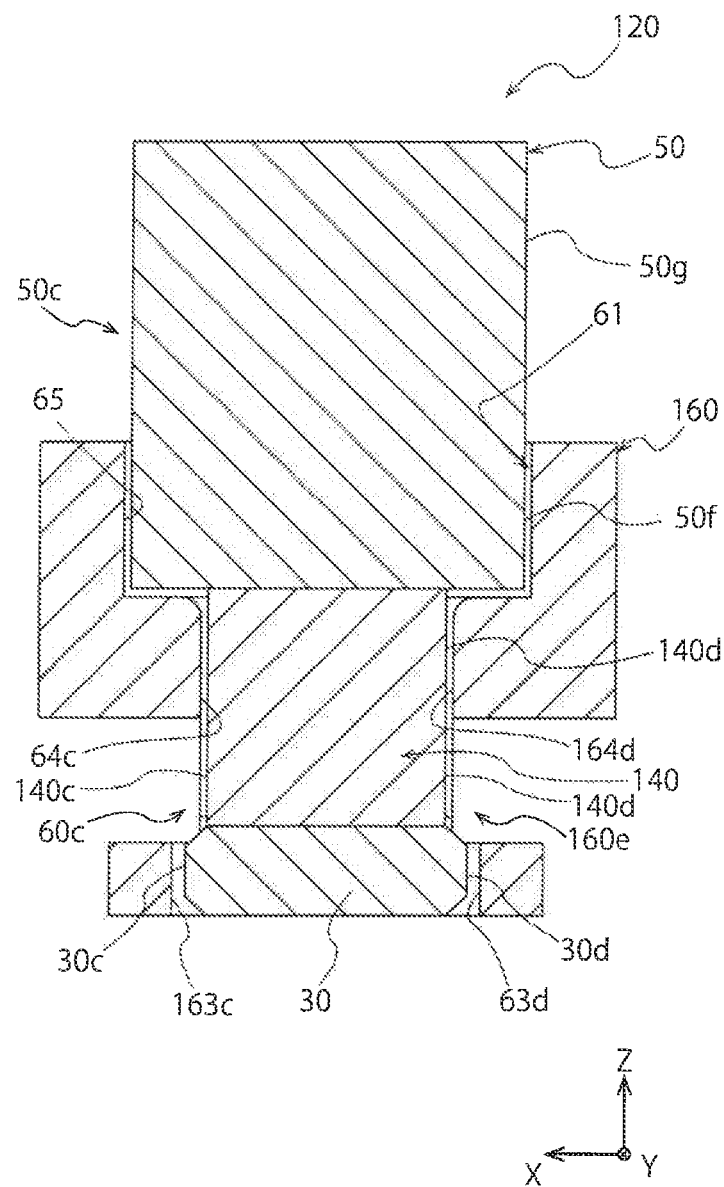
FIG. 10 is a cross sectional view of the piezoelectric unit shown in FIG. 9.

As shown in FIG. 10, which is a cross sectional view, a piezoelectric element 140 contained in the piezoelectric actuator 120 has four outer circumferential surfaces, and a pair of external electrodes is formed on a first outer circumferential surface 140c facing the positive side of the X-axis direction and a second outer circumferential surface 140d facing the negative side of the X-axis direction. Thus, the external electrode formed on the first outer circumferential surface 140c is exposed outside the protection member 160 via the third opening 60c of the protection member 160, but the protection member 160 is not provided with a fourth opening 60d as shown in FIG. 6. Thus, a first lower wall surface 163c facing the first outer circumferential surface 30c of the weight 30 has a symmetrical shape to the second lower wall surface 63d facing the second outer circumferential surface 30d of the weight 30 on an inner wall surface 161 of the protection member 160.

A fifth opening 160e exposing the second outer circumferential surface 140d of the piezoelectric element 140 is formed on a side surface facing the negative side of the X-axis direction of the protection member 160. The fifth opening 160e is formed symmetrically to the third opening 60c, and the external electrode formed on the second outer circumferential surface 140d is exposed outside the protection member 160 via the fifth opening 160e. A second middle wall surface 164d facing the second outer circumferential surface 140d of the piezoelectric element 140 has a symmetrical shape to the first middle wall surface 64c facing the first outer circumferential surface 140c of the piezoelectric element 140 on the inner wall surface 161 of the protection member 160.

Figure 11A:
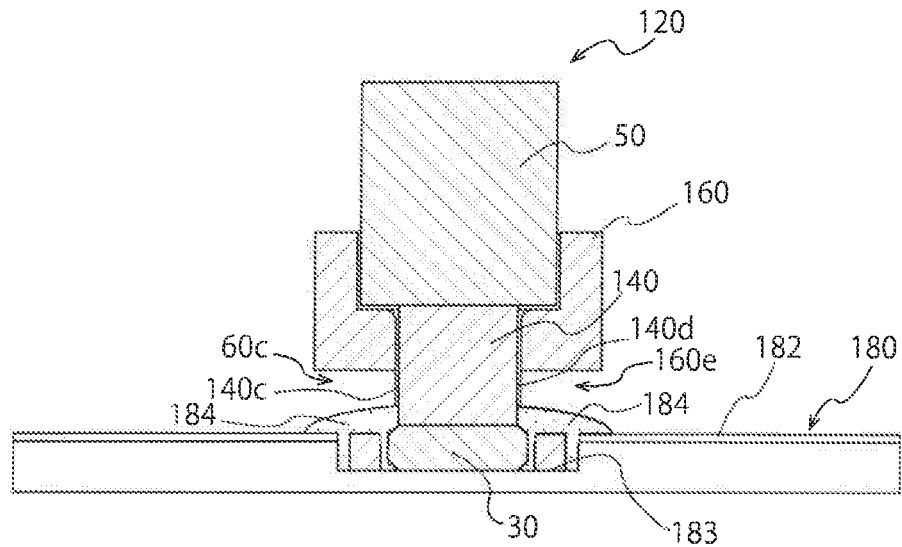
FIGS. 11A and 11B are conceptual views showing a state where the piezoelectric unit according to Third Embodiment is mounted on a board.

FIG. 11A is a conceptual view showing a state where the piezoelectric actuator 120 shown in FIG. 9 and FIG. 10 is mounted on a mount board 180. The piezoelectric actuator 120 is arranged in a hollow 183 of the mount board 180. In the piezoelectric element 140, the first outer circumferential surface 140c and the second outer circumferential surface 140d with the external electrodes are exposed from the third and fifth openings 60c and 160e of the protection member 160. The external electrodes of the piezoelectric element 140 of the piezoelectric actuator 120 are connected with wirings 182 of the mount board 180 via a conductive connection member 184, such as a solder, formed to communicate the third and fifth openings 60c and 160e.

Figure 11B:
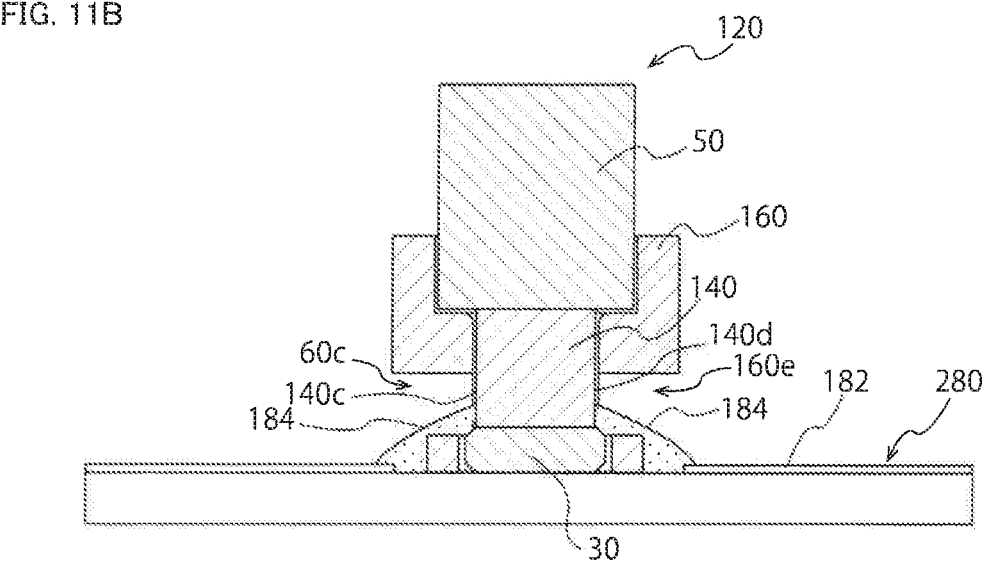

As shown in FIG. 11B, the piezoelectric actuator 120 may be mounted on a mount board 280 with no hollow. In this case, the external electrodes of the piezoelectric element 140 of the piezoelectric actuator 120 are also connected with wirings 182 of the mount board 180 via the conductive connection member 184 of a solder, such as a solder, formed to communicate the third and fifth openings 60c and 160e.

In the piezoelectric actuator 120 according to Third Embodiment, the external electrodes of the piezoelectric element 140 are exposed from the protection member 160 via the third opening 60c and the fifth opening 160e of the protection member 160. Thus, the piezoelectric actuator 120 can easily connect the mount boards 180 and 280, where the piezoelectric actuator 120 is mounted, and the external electrodes by a conductive connection member, such as a solder.

The present invention is described with the embodiments, but the present invention is not limited to having the piezoelectric units mentioned in the embodiments. Needless to say, various other piezoelectric units are included in the technical scope of the present invention. For example, the piezoelectric element 40 and the weight 30 are not limited to having a rectangular parallelepiped outer shape as shown in the embodiments, but may have a three-dimensional shape that is different from the shapes of the embodiments, such as a polygonal prism excluding a columnar shape and a rectangular parallelepiped shape. The protection members 60 and 160 are not limited to having the outer shapes shown in the embodiments either, and the inner wall surfaces 61 and 161 are not limited to having the shapes shown in the embodiments either.

The weight position regulating position, the element position regulating position, and the movable member regulating position owned by the inner walls of the protection members 60 and 160 are not limited to having plane surfaces, such as the first to fourth lower wall surfaces 63c to 63f and the first to fourth middle wall surfaces 64c to 64f, and may be a protrusion or so formed on the inner wall surface.

NUMERICAL REFERENCES

10 . . . piezoelectric unit
12 . . . lens holder
12c . . . holder outer circumferential surface
14 . . . energization member
20, 120 . . . piezoelectric actuator
30 . . . weight
30c, 30d, 30e, 30f . . . first to fourth outer circumferential surfaces
40, 140 . . . piezoelectric element
40a . . . first end surface
40b . . . second end surface
40c, 140c, 40d, 140d, 40e, 40f . . . first to fourth outer circumferential surface
50 . . . drive shaft
50c . . . shaft outer circumferential surface
50g . . . shaft exposed portion
50f . . . shaft covered portion
60, 160 . . . protection member
60a, 60b, 60c, 60d, 160e . . . first to fifth openings
61 . . . inner wall surface
63c, 163c, 63d, 63e, 63f . . . first to fourth lower wall surface
64c, 64d, 164d, 64e, 64f . . . first to fourth middle wall surface
65 . . . shaft position regulating member
66 . . . first relief portion
67 . . . second relief portion
69 . . . movable member regulating portion
71, 72 . . . step surface
74a, 75a . . . fine clearance
80 . . . mount substrate
82 . . . wiring
90, 92 . . . pedestal

The invention claimed is:

1. A piezoelectric unit comprising:
a piezoelectric element that expands and contracts in a first direction;
a drive shaft connected with a first end surface that is one end surface of the piezoelectric element in the first direction;
a weight connected with a second end surface that is the other end surface of the piezoelectric element in the first direction;
a protection member covering at least a part of the piezoelectric element, at least a part of the drive shaft, and at least a part of the weight; and
a movable member configured to be engaged with a shaft exposed portion exposed from the protection member in the drive shaft in a relatively movably manner along the first direction,
wherein an inner wall surface of the protection member comprises:
a weight position regulating portion facing an outer circumferential surface of the weight and configured to regulate a position of the weight in a vertical direction to the first direction;
an element position regulating portion facing an outer circumferential surface of the piezoelectric element and configured to regulate a position of the piezoelectric element in the vertical direction to the first direction; and
a shaft position regulating portion facing an outer circumferential surface of the drive shaft and configured to regulate a position of the drive shaft in the vertical direction to the first direction, and
an outer wall surface of the protection member has a movable member regulating portion facing the movable member in the vertical direction to the first direction and configured to prevent the movable member from approaching the piezoelectric element in the vertical direction to the first direction.

2. The piezoelectric unit according to claim 1, wherein the weight is fixed to the inner wall surface,
the element position regulating portion is arranged with a first fine clearance against the piezoelectric element, and
the shaft position regulating portion is arranged with a second fine clearance against the drive shaft.

3. A piezoelectric unit comprising:
a piezoelectric element that expands and contracts in a first direction;
a drive shaft connected with a first end surface that is one end surface of the piezoelectric element in the first direction;
a weight connected with a second end surface that is the other end surface of the piezoelectric element in the first direction; and
a protection member covering at least a part of the piezoelectric element, at least a part of the drive shaft, and at least a part of the weight,
wherein an inner wall surface of the protection member comprises:
a weight position regulating portion facing an outer circumferential surface of the weight and configured to regulate a position of the weight in a vertical direction to the first direction;
an element position regulating portion facing an outer circumferential surface of the piezoelectric element and configured to regulate a position of the piezoelectric element in the vertical direction to the first direction; and
a shaft position regulating portion facing an outer circumferential surface of the drive shaft and configured to regulate a position of the drive shaft in the vertical direction to the first direction, the weight is fixed to the inner wall surface, the element position regulating portion is arranged with a first fine clearance against the piezoelectric element, and the shaft position regulating portion is arranged with a second fine clearance against the drive shaft.

4. The piezoelectric unit according to claim 3, further comprising a movable member configured to be engaged with a shaft exposed portion exposed from the protection member in the drive shaft in a relatively movably manner along the first direction, wherein an outer wall surface of the protection member has a movable member regulating portion facing the movable member in the vertical direction to the first direction and configured to prevent the movable member from approaching the piezoelectric element in the vertical direction to the first direction.

5. The piezoelectric unit according to claim 1, wherein the piezoelectric element has an external electrode for supplying electricity, and at least a part of the external electrode is exposed from the protection member.

6. The piezoelectric unit according to claim 3, wherein the piezoelectric element has an external electrode for supplying electricity, and at least a part of the external electrode is exposed from the protection member.

7. The piezoelectric unit according to claim 1, wherein the inner wall surface has a relief portion positioned between the element position regulating portion and the weight position regulating portion, a distance between the relief position and the piezoelectric element is longer than a distance between the element position regulating portion and the piezoelectric element, and a distance between the relief position and the weight is longer than a distance between the weight position regulating portion and the weight.

8. The piezoelectric unit according to claim 3, wherein the inner wall surface has a relief portion positioned between the element position regulating portion and the weight position regulating portion, a distance between the relief position and the piezoelectric element is longer than a distance between the element position regulating portion and the piezoelectric element, and a distance between the relief position and the weight is longer than a distance between the weight position regulating portion and the weight.

\* \* \* \* \*